United States Patent
Benedict et al.

(10) Patent No.: US 10,288,326 B2
(45) Date of Patent: May 14, 2019

(54) CONDUCTION HEAT PUMP

(71) Applicant: Haier US Appliance Solutions, Inc., Wilmington, DE (US)

(72) Inventors: Michael Alexander Benedict, Louisville, KY (US); Michael Goodman Schroeder, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 346 days.

(21) Appl. No.: 15/369,956

(22) Filed: Dec. 6, 2016

(65) Prior Publication Data
US 2018/0156502 A1    Jun. 7, 2018

(51) Int. Cl.
*F25B 21/00*    (2006.01)

(52) U.S. Cl.
CPC ........ *F25B 21/00* (2013.01); *F25B 2321/002* (2013.01); *F25B 2321/0022* (2013.01); *Y02B 30/66* (2013.01)

(58) Field of Classification Search
CPC ................ F25B 21/00; F25B 2321/002; F25B 2321/00; Y02B 30/6622
See application file for complete search history.

(56) References Cited

U.S. PATENT DOCUMENTS

| | | | |
|---|---|---|---|
| 668,560 A | 2/1901 | Fulner et al. | |
| 2,671,929 A | 3/1954 | Gayler | |
| 2,765,633 A | 10/1956 | Muffly | |
| 3,816,029 A | 6/1974 | Bowen et al. | |
| 4,037,427 A | 7/1977 | Kramer | |
| 4,107,935 A | 8/1978 | Steyert, Jr. | |
| 4,200,680 A | 4/1980 | Sasazawa et al. | |
| 4,259,843 A | 4/1981 | Kausch | |
| 4,507,927 A | 4/1985 | Barclay | |
| 4,507,928 A | 4/1985 | Johnson | |
| 4,549,155 A | 10/1985 | Halbach | |
| 4,554,790 A | 11/1985 | Nakagome et al. | |
| 4,557,228 A | 12/1985 | Samodovitz | |
| 4,599,866 A | 7/1986 | Nakagome et al. | |
| 4,625,519 A | 12/1986 | Hakuraku et al. | |
| 4,642,994 A | 2/1987 | Barclay et al. | |
| 4,785,636 A | 11/1988 | Hakuraku et al. | |

(Continued)

FOREIGN PATENT DOCUMENTS

| CA | 2893874 A1 | 6/2014 |
|---|---|---|
| CA | 2919117 A1 | 1/2015 |

(Continued)

OTHER PUBLICATIONS

International Search Report of PCT/US2014/047925 dated Nov. 10, 2014.

(Continued)

*Primary Examiner* — Elizabeth J Martin
(74) *Attorney, Agent, or Firm* — Dority & Manning, P.A.

(57) ABSTRACT

A conduction heat pump includes a first plate, a second plate and a third plate. The second plate includes a caloric material and is positioned between the first and third plates. The first, second and third plates of the conduction heat pump also includes features for conductively transferring heat from the third plate to the first plate during relative rotation between the second plate and the first plate.

22 Claims, 6 Drawing Sheets

(56) References Cited

U.S. PATENT DOCUMENTS

| | | |
|---|---|---|
| 4,796,430 A | 1/1989 | Malaker et al. |
| 5,091,361 A | 2/1992 | Hed |
| 5,156,003 A | 10/1992 | Yoshiro et al. |
| 5,249,424 A | 10/1993 | DeGregoria et al. |
| 5,336,421 A | 8/1994 | Kurita et al. |
| 5,351,791 A | 10/1994 | Rosenzweig |
| 5,465,781 A | 11/1995 | DeGregoria |
| 5,599,177 A | 2/1997 | Hetherington |
| 5,661,895 A | 9/1997 | Irgens |
| 5,718,570 A | 2/1998 | Beckett et al. |
| 5,934,078 A | 8/1999 | Lawton, Jr. et al. |
| 6,332,323 B1 | 12/2001 | Reid et al. |
| 6,423,255 B1 | 7/2002 | Hoechsmann et al. |
| 6,446,441 B1 | 9/2002 | Dean |
| 6,526,759 B2 | 3/2003 | Zimm et al. |
| 6,588,215 B1 | 7/2003 | Ghoshal |
| 6,668,560 B2 | 12/2003 | Zimm et al. |
| 6,915,647 B2 | 7/2005 | Tsuchikawa et al. |
| 6,935,121 B2 | 8/2005 | Fang et al. |
| 6,946,941 B2 | 9/2005 | Chell |
| 6,971,245 B2 | 12/2005 | Kuroyanagi |
| 7,148,777 B2 | 12/2006 | Chell et al. |
| 7,313,926 B2 | 1/2008 | Gurin |
| 7,481,064 B2 | 1/2009 | Kitanovski et al. |
| 7,552,592 B2 | 6/2009 | Iwasaki et al. |
| 7,644,588 B2 | 1/2010 | Shin et al. |
| 7,863,789 B2 | 1/2011 | Zepp et al. |
| 7,897,898 B2 | 3/2011 | Muller et al. |
| 7,938,632 B2 | 5/2011 | Smith |
| 8,069,662 B1 | 12/2011 | Albert |
| 8,099,964 B2 | 1/2012 | Saito et al. |
| 8,174,245 B2 | 5/2012 | Carver |
| 8,191,375 B2 | 6/2012 | Sari et al. |
| 8,209,988 B2 | 7/2012 | Zhang et al. |
| 8,216,396 B2 | 7/2012 | Dooley et al. |
| 8,310,325 B2 | 11/2012 | Zhang et al. |
| 8,375,727 B2 | 2/2013 | Sohn |
| 8,378,769 B2 | 2/2013 | Heitzler et al. |
| 8,448,453 B2 | 5/2013 | Bahl et al. |
| 8,551,210 B2 | 10/2013 | Reppel et al. |
| 8,596,084 B2 | 12/2013 | Herrera et al. |
| 8,616,009 B2 | 12/2013 | Dinesen et al. |
| 8,656,725 B2 | 2/2014 | Muller et al. |
| 8,695,354 B2 | 4/2014 | Heitzler et al. |
| 8,729,718 B2 | 5/2014 | Kuo et al. |
| 8,763,407 B2 | 7/2014 | Carroll et al. |
| 8,769,966 B2 | 7/2014 | Heitzler et al. |
| 8,869,541 B2 | 10/2014 | Heitzler et al. |
| 8,904,806 B2 | 12/2014 | Cramet et al. |
| 8,935,927 B2 | 1/2015 | Kobayashi et al. |
| 9,175,885 B2 | 11/2015 | Katter |
| 9,245,673 B2 | 1/2016 | Carroll et al. |
| 9,377,221 B2 | 6/2016 | Benedict |
| 9,400,126 B2 | 7/2016 | Takahashi et al. |
| 9,523,519 B2 | 12/2016 | Muller |
| 9,534,817 B2 | 1/2017 | Benedict et al. |
| 9,548,151 B2 | 1/2017 | Muller |
| 9,599,374 B2 | 3/2017 | Takahashi et al. |
| 9,631,843 B2 | 4/2017 | Benedict |
| 9,702,594 B2 | 7/2017 | Vetrovec |
| 9,739,510 B2 | 8/2017 | Hassen |
| 9,797,630 B2 | 10/2017 | Benedict et al. |
| 9,810,454 B2 | 11/2017 | Tasaki et al. |
| 9,857,105 B1 | 1/2018 | Schroeder et al. |
| 9,857,106 B1 | 1/2018 | Schroeder et al. |
| 2002/0040583 A1 | 4/2002 | Barclay et al. |
| 2003/0010054 A1 | 1/2003 | Esch et al. |
| 2003/0051774 A1 | 3/2003 | Saito |
| 2004/0093877 A1 | 5/2004 | Wada |
| 2004/0182086 A1 | 9/2004 | Chiang et al. |
| 2004/0187803 A1 | 9/2004 | Regev |
| 2004/0250550 A1 | 12/2004 | Bruck |
| 2005/0109490 A1 | 5/2005 | Harmon et al. |
| 2005/0274676 A1 | 12/2005 | Kumar et al. |
| 2006/0231163 A1 | 10/2006 | Hirosawa et al. |
| 2007/0130960 A1 | 6/2007 | Muller et al. |
| 2007/0220901 A1 | 9/2007 | Kobayashi |
| 2008/0236171 A1 | 10/2008 | Saito et al. |
| 2008/0303375 A1 | 12/2008 | Carver |
| 2009/0091411 A1 | 4/2009 | Zhang et al. |
| 2009/0158749 A1 | 6/2009 | Sandeman |
| 2009/0217674 A1 | 9/2009 | Kaji et al. |
| 2009/0236930 A1 | 9/2009 | Nashiki |
| 2009/0266083 A1 | 10/2009 | Shin et al. |
| 2009/0308080 A1 | 12/2009 | Han et al. |
| 2010/0000228 A1 | 1/2010 | Wiest et al. |
| 2010/0058775 A1 | 3/2010 | Kaji et al. |
| 2010/0071383 A1 | 3/2010 | Zhang et al. |
| 2010/0116471 A1 | 5/2010 | Reppel |
| 2010/0209084 A1 | 8/2010 | Nelson et al. |
| 2010/0236258 A1 | 9/2010 | Heitzler et al. |
| 2010/0276627 A1 | 11/2010 | Mazet |
| 2011/0042608 A1 | 2/2011 | Reesink |
| 2011/0048031 A1 | 3/2011 | Barve |
| 2011/0048690 A1 | 3/2011 | Reppel et al. |
| 2011/0058795 A1 | 3/2011 | Kleman et al. |
| 2011/0062821 A1 | 3/2011 | Chang et al. |
| 2011/0082026 A1 | 4/2011 | Sakatani et al. |
| 2011/0162388 A1 | 7/2011 | Barve et al. |
| 2011/0168363 A9 | 7/2011 | Reppel et al. |
| 2011/0173993 A1 | 7/2011 | Muller et al. |
| 2011/0182086 A1 | 7/2011 | Mienko et al. |
| 2011/0192836 A1 | 8/2011 | Muller et al. |
| 2011/0218921 A1 | 9/2011 | Addala et al. |
| 2011/0239662 A1 | 10/2011 | Bahl et al. |
| 2011/0284196 A1 | 11/2011 | Zanadi |
| 2011/0302931 A1 | 12/2011 | Sohn |
| 2011/0308258 A1 | 12/2011 | Smith et al. |
| 2012/0031108 A1 | 2/2012 | Kobayashi et al. |
| 2012/0033002 A1 | 2/2012 | Seeler et al. |
| 2012/0036868 A1 | 2/2012 | Heitzler et al. |
| 2012/0045698 A1 | 2/2012 | Shima |
| 2012/0079834 A1 | 4/2012 | Dinesen |
| 2012/0222427 A1 | 9/2012 | Hassen |
| 2012/0222428 A1 | 9/2012 | Celik et al. |
| 2012/0267090 A1 | 10/2012 | Kruglick |
| 2012/0272666 A1 | 11/2012 | Watanabe |
| 2012/0285179 A1 | 11/2012 | Morimoto |
| 2012/0291453 A1 | 11/2012 | Watanabe et al. |
| 2013/0019610 A1 | 1/2013 | Zimm et al. |
| 2013/0104568 A1 | 5/2013 | Kuo et al. |
| 2013/0180263 A1 | 7/2013 | Choi et al. |
| 2013/0186107 A1 | 7/2013 | Shih et al. |
| 2013/0187077 A1 | 7/2013 | Katter |
| 2013/0192269 A1 | 8/2013 | Wang |
| 2013/0199460 A1 | 8/2013 | Duplessis et al. |
| 2013/0200293 A1 | 8/2013 | Zhao et al. |
| 2013/0227965 A1 | 9/2013 | Yagi et al. |
| 2013/0232993 A1 | 9/2013 | Saito et al. |
| 2013/0255279 A1 | 10/2013 | Tomimatsu et al. |
| 2013/0269367 A1 | 10/2013 | Meillan |
| 2013/0298571 A1 | 11/2013 | Morimoto et al. |
| 2013/0300243 A1 | 11/2013 | Gieras et al. |
| 2013/0319012 A1 | 12/2013 | Kuo et al. |
| 2013/0327062 A1 | 12/2013 | Watanabe et al. |
| 2014/0020881 A1 | 1/2014 | Reppel et al. |
| 2014/0075958 A1 | 3/2014 | Takahashi et al. |
| 2014/0116538 A1 | 5/2014 | Tanaka et al. |
| 2014/0165594 A1 | 6/2014 | Benedict |
| 2014/0165595 A1 | 6/2014 | Zimm et al. |
| 2014/0190182 A1 | 7/2014 | Benedict |
| 2014/0216057 A1 | 8/2014 | Oezcan |
| 2014/0260373 A1 | 9/2014 | Gerber et al. |
| 2014/0290273 A1 | 10/2014 | Benedict et al. |
| 2014/0290275 A1 | 10/2014 | Muller |
| 2014/0291570 A1 | 10/2014 | Klausner et al. |
| 2014/0305137 A1 | 10/2014 | Benedict |
| 2014/0305139 A1 | 10/2014 | Takahashi et al. |
| 2014/0325996 A1 | 11/2014 | Muller |
| 2015/0007582 A1 | 1/2015 | Kim et al. |
| 2015/0027133 A1 | 1/2015 | Benedict |
| 2015/0030483 A1 | 1/2015 | Ryu |
| 2015/0033762 A1 | 2/2015 | Cheng et al. |
| 2015/0033763 A1 | 2/2015 | Saito et al. |

(56) References Cited

U.S. PATENT DOCUMENTS

| | | |
|---|---|---|
| 2015/0047371 A1 | 2/2015 | Hu et al. |
| 2015/0068219 A1 | 3/2015 | Komorowski et al. |
| 2015/0114007 A1 | 4/2015 | Neilson et al. |
| 2015/0168030 A1 | 6/2015 | Leonard et al. |
| 2015/0211440 A1 | 7/2015 | Joffroy |
| 2015/0260433 A1 | 9/2015 | Choi et al. |
| 2015/0267943 A1 | 9/2015 | Kim et al. |
| 2015/0362225 A1 | 12/2015 | Schwartz |
| 2016/0000999 A1 | 1/2016 | Focht et al. |
| 2016/0084544 A1 | 3/2016 | Radermacher et al. |
| 2016/0091227 A1 | 3/2016 | Leonard et al. |
| 2016/0238287 A1* | 8/2016 | Benedict ............... F25B 21/00 |
| 2016/0355898 A1 | 12/2016 | Vieyra Villegas et al. |
| 2016/0356529 A1 | 12/2016 | Humburg |
| 2017/0059213 A1 | 3/2017 | Barclay et al. |
| 2017/0071234 A1 | 3/2017 | Garg |
| 2017/0138648 A1 | 5/2017 | Cui et al. |
| 2017/0328603 A1 | 11/2017 | Barclay et al. |
| 2017/0328649 A1 | 11/2017 | Brandmeier |
| 2017/0370624 A1 | 12/2017 | Zimm et al. |

FOREIGN PATENT DOCUMENTS

| | | |
|---|---|---|
| CN | 101979937 A | 2/2011 |
| CN | 201772566 U | 3/2011 |
| CN | 101788207 B | 9/2011 |
| CN | 202432596 U | 9/2012 |
| CN | 103090583 A | 5/2013 |
| CN | 103712401 A | 4/2014 |
| CN | 102077303 B | 4/2015 |
| DE | 102013223959 A1 | 5/2015 |
| DE | 202015106851 U1 | 3/2016 |
| EP | 2071255 | 6/2009 |
| EP | 2108904 A1 | 10/2009 |
| EP | 2215955 A1 | 8/2010 |
| FR | 2935468 A1 | 3/2010 |
| JP | 59232922 | 12/1984 |
| JP | 3205196 B2 | 9/2001 |
| JP | 2002315243 A | 10/2002 |
| JP | 2007147136 A | 6/2007 |
| JP | 2007291437 A | 11/2007 |
| JP | 2008051412 A | 3/2008 |
| JP | 2010112606 A | 5/2010 |
| JP | 6212955 B2 | 12/2014 |
| JP | 2017207222 A | 11/2017 |
| KR | 101100301 B1 | 12/2011 |
| KR | 1238234 B1 | 3/2013 |
| WO | WO 0212800 A1 | 2/2002 |
| WO | WO 03016794 A1 | 2/2003 |
| WO | WO 2004/068512 | 8/2004 |
| WO | WO 2007/036729 A1 | 4/2007 |
| WO | WO 2009/024412 | 2/2009 |
| WO | WO 2011034594 A1 | 3/2011 |
| WO | WO 2014099199 A1 | 6/2014 |
| WO | WO 2014170447 A1 | 10/2014 |
| WO | WO 2014173787 A1 | 10/2014 |
| WO | WO 2015017230 A1 | 2/2015 |
| WO | WO 2017042266 A1 | 3/2017 |

OTHER PUBLICATIONS

Andrej Kitanovski, Present and future caloric refrigeration and heat-pump technologies, International Journal of Refrigeration, vol. 57, Sep. 2015, pp. 288-298.
International Search Report issued in connection with PCT Application No. PCT/US2014/042485 dated Oct. 23, 2014.
International Search Report issued in connection with PCT Application No. PCT/US2014/017431 dated May 9, 2014.
International search report issued in connection with PCT/US2013/070518, dated Jan. 22, 2014.
Tetsuji Okamura, Performance of a room-temperature rotary magnet refrigerator, dated Nov. 28, 2005, Elsevier.
Journal of Alloys and Compounds, copyright 2008 Elsevier B..V. Evaluation of Ni—Mn—In—Si Alloys for Magnetic Refrigerant Application, Rahul Das, A. Perumal and A. Srinivasan, Dept of Physics, Indian Institute of Technology, Oct. 10, 2011.
Effects of annealing on the magnetic entropy change and exchange bias behavior in melt-spun Ni—Mn—In ribbons, X.Z. Zhao, C.C. Hsieh, et al Science Direct, Scripta Materialia 63 (2010).
PCT International Search Report and Written Opinion issued in connection with PCT Application No. PCT/US2013/070023 dated Feb. 27, 2014.
Barbara Pulko, Epoxy-bonded La—Fe—Co—Si magnetocaloric plates, Journal of Magnetism and Magnetic Materials, 375 (2015) 65-73.

* cited by examiner

CONDUCTION HEAT PUMP

FIELD OF THE INVENTION

The present subject matter relates generally to heat pumps, such as heat pumps for appliances.

BACKGROUND OF THE INVENTION

Conventional refrigeration technology typically utilizes a heat pump that relies on compression and expansion of a fluid refrigerant to receive and reject heat in a cyclic manner so as to effect a desired temperature change or i.e. transfer heat energy from one location to another. This cycle can be used to provide e.g., for the receiving of heat from a refrigeration compartment and the rejecting of such heat to the environment or a location that is external to the compartment. Other applications include air conditioning of residential or commercial structures. A variety of different fluid refrigerants have been developed that can be used with the heat pump in such systems.

While improvements have been made to such heat pump systems that rely on the compression of fluid refrigerant, at best such can still only operate at about forty-five percent or less of the maximum theoretical Carnot cycle efficiency. Also, some fluid refrigerants have been discontinued due to environmental concerns. The range of ambient temperatures over which certain refrigerant-based systems can operate may be impractical for certain locations. Other challenges with heat pumps that use a fluid refrigerant exist as well.

Solid state caloric materials (SSCMs), i.e. materials that exhibit a change in entropy in response to an externally applied field, provide a potential alternative to fluid refrigerants for heat pump applications. For example in magnetocaloric materials (MCM), the magnetic moments of an MCM will become more ordered under an increasing, externally applied magnetic field and cause the MCM to generate heat. Conversely, decreasing the externally applied magnetic field will allow the magnetic moments of the MCM to become more disordered and allow the MCM to absorb heat. Some MCMs exhibit the opposite behavior, i.e. generating heat when the magnetic field is removed (which are sometimes referred to as para-magneto-caloric material but both types are referred to collectively herein as magneto-caloric material or MCM). The theoretical percentage of Carnot cycle efficiency achievable for a refrigeration cycle based on an MCM or other SSCM can be significantly higher than for a comparable refrigeration cycle based on a fluid refrigerant. As such, a heat pump system that can effectively use an SSCM would be useful.

Challenges exist to the practical and cost competitive use of an SSCM, however. In addition to the development of suitable SSCMs, equipment that can attractively utilize an SSCM is still needed. Currently proposed equipment may require relatively large and expensive equipment for field application, may be impractical for use in e.g., appliance refrigeration, and may not otherwise operate with enough efficiency to justify capital cost.

Accordingly, a heat pump system that can address certain challenges, such as those identified above, would be useful. Such a heat pump system that can also be used in e.g., a refrigerator appliance would also be useful.

BRIEF DESCRIPTION OF THE INVENTION

The present subject matter provides a conduction heat pump with a first plate and a second plate. The second plate includes a caloric material and is positioned immediately proximate to the first plate in the axial direction. The conduction heat pump has a heat receiving side and a heat rejecting side in an axial direction. The heat receiving side and heat rejecting side may also be field receiving. The first plate of the conduction heat pump also includes features for alternately conductively transferring heat from the second plate and insulating heat transfer from the second plate during relative rotation between the first and second plates. An insulating portion of the first plate either generates field in the direction of the heat rejection side of the conduction heat pump, or is field shielding and receiving. A conductive portion of the first plate has opposite characteristic of the insulation portion: is field shielding and receiving when the insulating portion generates field, or generates field in the direction of the heat accepting end of the conduction heat pump when the insulating portion is field shielding and receiving. Additional aspects and advantages of the invention will be set forth in part in the following description, or may be apparent from the description, or may be learned through practice of the invention.

In a first exemplary embodiment, a conduction heat pump is provided. The conduction heat pump includes a first and second plate. The first plate has a field generator portion and a conductive portion. The field generator portion of the first plate is less thermally conductive than the conduction portion of the first plate and generates field in the direction of a heat rejection side of the conduction heat pump. The second plate includes a caloric material. The second plate is proximate the first plate such that relative rotation between the second plate and the first plate provides movement of the caloric material of second plate relative to the field generator portion of the first plate. A temperature of the caloric material of the second plate is changeable when the caloric material of the second plate is exposed to a field from the field generator portion of the first plate. The second plate is positioned proximate the first plate and a third plate. The third plate may be of the same type or construction as the first plate. The third plate is placed opposite the first plate on the second plate. The third plate may be rotationally exactly out of phase with the first plate such that the field generating portion of the first plate is in line axially with the field receiving portion of the third plate. The third plate may or may not have a field generating portion, though the conductive and insulating properties of the third plate are matched to the first plate. On the outside of the first and third plates are the heat rejection end of the conduction heat pump in the direction of the field generating portion of the first and third plates or the heat acceptance end of the conduction heat pump on an opposite side. The heat accepting side is placed proximate to the third plate. Conductive heat transfer between the caloric material of second plate and the heat rejection end of the conduction heat pump is achieved through the field accepting portion of the third plate for the portion of the second plate that is exposed to field. Heat acceptance through the field receiving portion of the first plate is achieved in the portion of the second plate that is remote from the field.

In a second exemplary embodiment, a conduction heat pump is provided. The conduction heat pump includes a first plate having a field generator portion and a field shielding portion. A second plate includes a caloric material. A third plate has a field shielding portion. The second plate is positioned between the first and third plates such that relative rotation between the second plate and the first plate provides movement of the caloric material of second plate relative to the field generator portion of the first plate. A temperature of the caloric material of the second plate is changeable when the caloric material of the second plate is exposed to a field from the field generator portion of the first plate. The field generator portion of the first plate has a thermal conductivity that is different than the field shielding portion of the first plate and the field shielding portion of the third plate. The second plate is positioned proximate the first and third plates for conductive heat transfer between the caloric material of second plate and the first and third plates.

In a third exemplary embodiment, a conduction heat pump is provided. The conductive heat pump includes a first plate having a field generator portion. A second plate includes a caloric material. A third plate is fixed relative to the first plate. The second plate is positioned between the first and third plates. The first, second and third plates include means for conductively transferring heat from the third plate to the first plate during relative rotation between the second plate and the first and third plates.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is directed to a caloric heat pump system for heating or cooling an appliance, such as a refrigerator appliance. While described in greater detail below in the context of a magneto-caloric heat pump system, one of skill in the art using the teachings herein will recognize that other suitable caloric materials may be used in a similar manner to heat or cool an appliance, i.e., apply a field, move heat, remove the field, move heat. For example, electro-caloric material heats up and cools down within increasing and decreasing electric fields. As another example, elasto-caloric material heats up and cools down when exposed to increasing and decreasing mechanical strain. As yet another example, baro-caloric material heats up and cools down when exposed to increasing and decreasing pressure. Such materials and other similar caloric materials may be used in place of or in addition to the magneto-caloric material described below to heat or cool fluid within an appliance. Thus, caloric material is used broadly herein to encompass materials that undergo heating or cooling when exposed to a changing field from a field generator, where the field generator may be a magnet, an electric field generator, an actuator for applying mechanical stress or pressure, etc.

Figure 1:
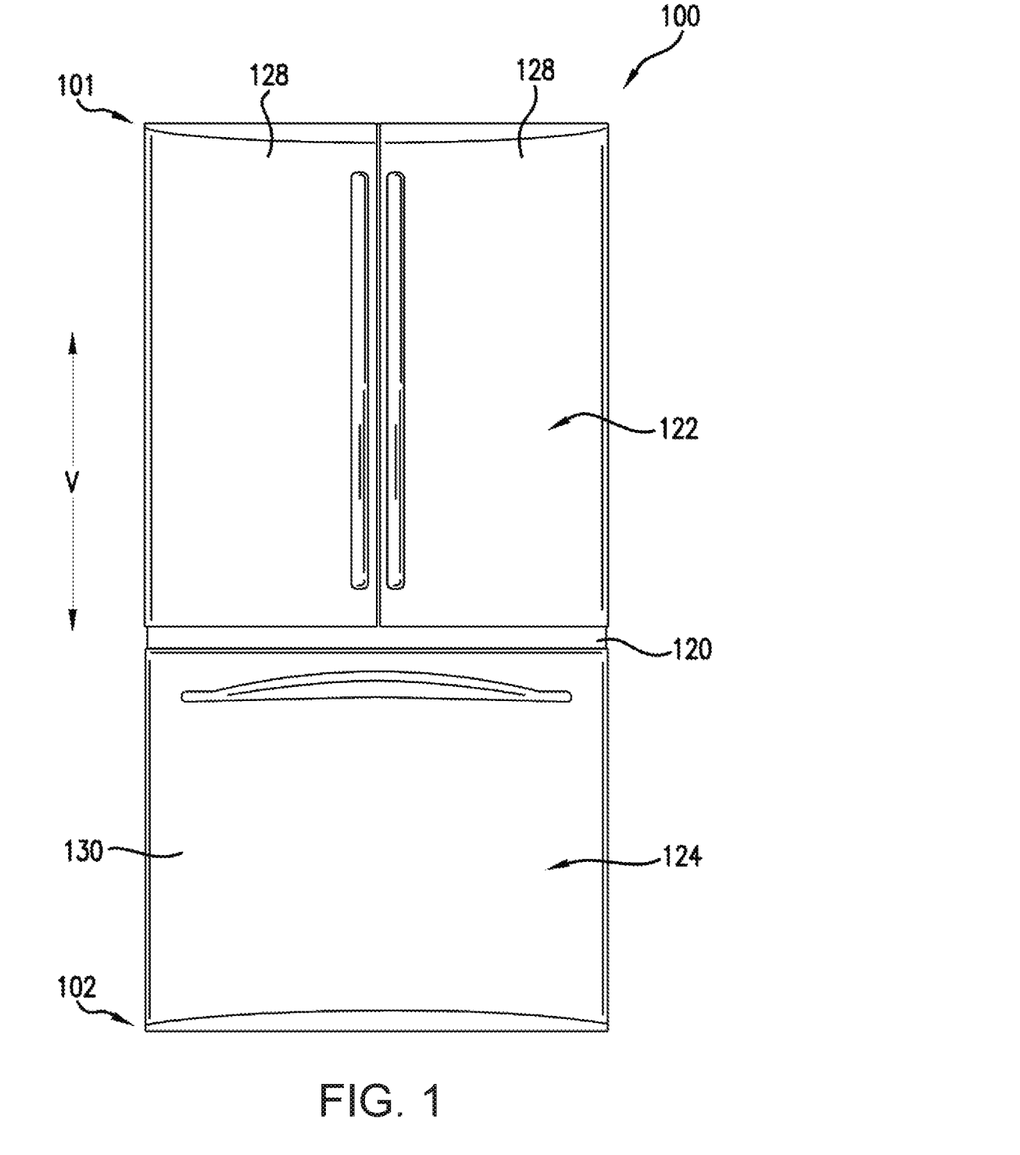
FIG. 1 provides a front, elevation view of a refrigerator appliance according to an exemplary embodiment of the present subject matter.
Figure 2:
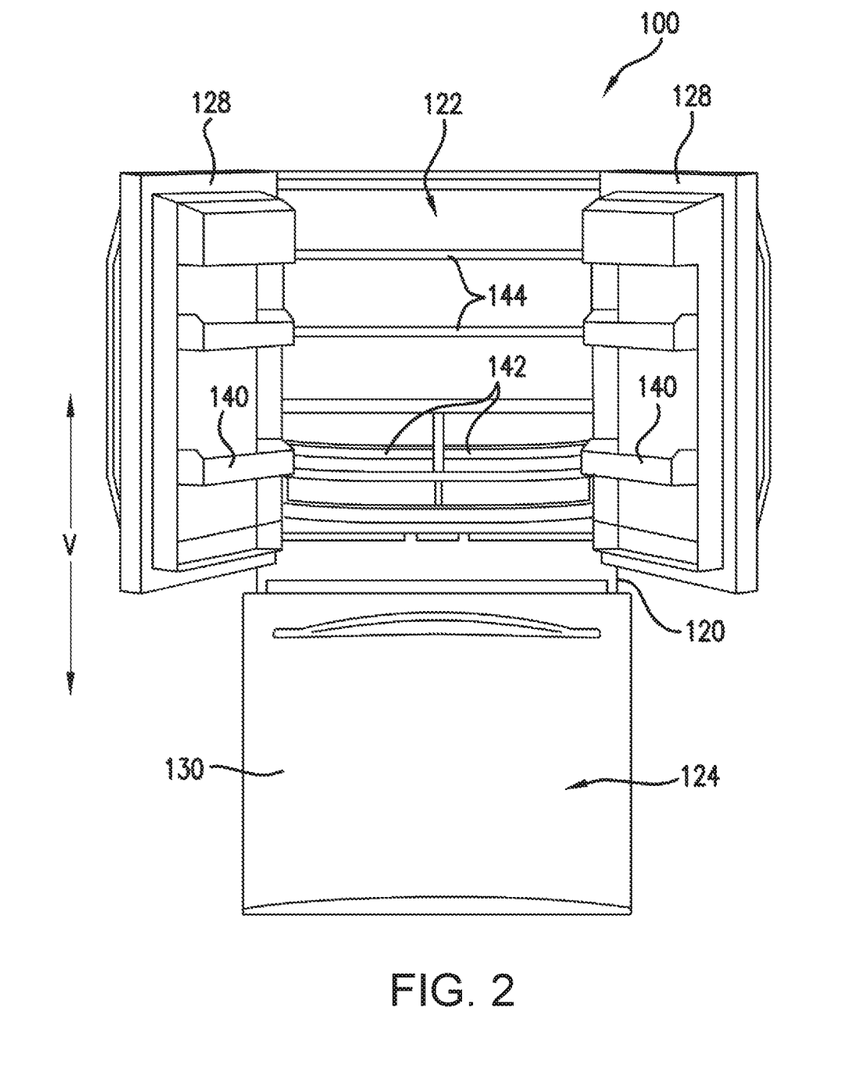
FIG. 2 provides a front, elevation view of the exemplary refrigerator appliance of FIG. 1 with refrigerator doors of the exemplary refrigerator appliance shown in an open position in order to reveal a fresh food chamber of the exemplary refrigerator appliance.

FIG. 1 provides a front, elevation view of a refrigerator appliance 100 according to an exemplary embodiment of the present subject matter with refrigerator doors 128 of the refrigerator appliance 100 shown in a closed position. FIG. 2 provides a front view of refrigerator appliance 100 with refrigerator doors 128 shown in an open position to reveal a fresh food chamber 122 of refrigerator appliance 100.

Refrigerator appliance 100 includes a cabinet or housing 120 that extends between a top 101 and a bottom 102 along a vertical direction V. Housing 120 defines chilled chambers for receipt of food items for storage. In particular, housing 120 defines fresh food chamber 122 positioned at or adjacent top 101 of housing 120 and a freezer chamber 124 arranged at or adjacent bottom 102 of housing 120. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance or a side-by-side style refrigerator appliance. Consequently, the description set forth herein is for illustrative purposes only and is not intended to be limiting in any aspect to any particular refrigerator chamber configuration.

Refrigerator doors 128 are rotatably hinged to an edge of housing 120 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. As discussed above, refrigerator doors 128 and freezer door 130 are shown in the closed configuration in FIG. 1, and refrigerator doors 128 are shown in the open position in FIG. 2.

Turning now to FIG. 2, various storage components are mounted within fresh food chamber 122 to facilitate storage of food items therein as will be understood by those skilled in the art. In particular, the storage components include bins 140, drawers 142, and shelves 144 that are mounted within fresh food chamber 122. Bins 140, drawers 142, and shelves 144 are configured for receipt of food items (e.g., beverages and/or solid food items) and may assist with organizing such food items. As an example, drawers 142 can receive fresh food items (e.g., vegetables, fruits, and/or cheeses) and increase the useful life of such fresh food items.

Figure 3:
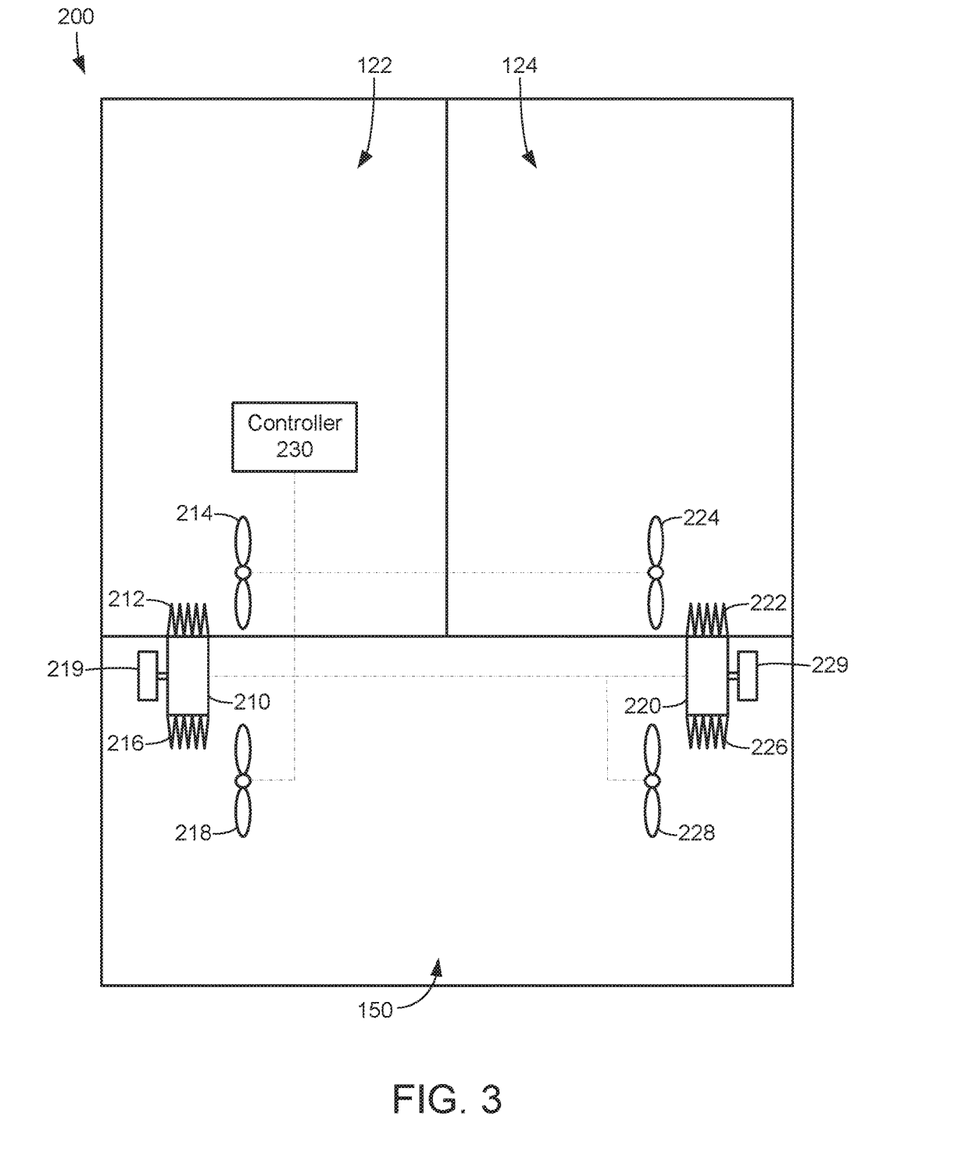
FIG. 3 provides a schematic view of a heat pump system for an appliance according to an exemplary embodiment of the present subject matter.

FIG. 3 provides a schematic view of a heat pump system 200 for an appliance according to an exemplary embodiment of the present subject matter. Heat pump system 200 can be used in any suitable refrigerator appliance. For example, heat pump system 200 may be used in refrigerator appliance 100, e.g., to cool fresh food chamber 122 and/or freezer chamber 124. Components of heat pump system 200 may be positioned within a machinery compartment 150, e.g., at bottom 102 of housing 120. Heat pump system 200 depicted in FIG. 3 is provided by way of example only. Thus, it is within the scope of the present subject matter for other configurations of the heat pump system to be used as well.

Heat pump system 200 contains components for cooling air and/or liquid. The components include a fresh food chamber or first conduction heat pump 210 and a freezer chamber or second conduction heat pump 220. Heat pump system 200 may be operable to chill fresh food chamber 122 by pumping heat with first conduction heat pump 210 from fresh food chamber 122 to machinery compartment 150 and ambient air about refrigerator appliance 100. Similarly, heat pump system 200 may be operable to chill freezer chamber 124 by pumping heat with second conduction heat pump 220 from freezer chamber 124 to machinery compartment 150 and ambient air about refrigerator appliance 100. It should be understood that the present subject matter is not limited to use with heat pump systems having two conduction heat pumps and may be implemented with a single conductive heat pump or three or more conductive heat pumps in alternative exemplary embodiments.

To facilitate chilling of air in fresh food chamber 122, a cold side heat exchanger 212 of first conduction heat pump 210 may be positioned at or within fresh food chamber 122 and cool air therein. Cold side heat exchanger 212 of first conduction heat pump 210 may include a plurality of plates, fins, pins, etc. to facilitate convective heat transfer with air about cold side heat exchanger 212 of first conduction heat pump 210. A fresh food chamber fan 214 is positioned at or proximate cold side heat exchanger 212 of first conduction heat pump 210. Fresh food chamber fan 214 is operable to circulate air within fresh food chamber 122 and pull air in fresh food chamber 122 across cold side heat exchanger 212 of first conduction heat pump 210 so as to provide forced convection for a more rapid and efficient heat exchange between cold side heat exchanger 212 of first conduction heat pump 210 and the air within fresh food chamber 122.

To facilitate chilling of air in freezer chamber 124, a cold side heat exchanger 222 of second conduction heat pump 220 may be positioned at or within freezer chamber 124 and cool air therein. Cold side heat exchanger 222 of second conduction heat pump 220 may include a plurality of plates, fins, pins, etc. to facilitate convective heat transfer with air about cold side heat exchanger 222 of second conduction heat pump 220. A freezer chamber fan 224 is positioned at or proximate cold side heat exchanger 222 of second conduction heat pump 220. Freezer chamber fan 224 is operable to circulate air within freezer chamber 124 and pull air in freezer chamber 124 across cold side heat exchanger 222 of second conduction heat pump 220 so as to provide forced convection for a more rapid and efficient heat exchange between cold side heat exchanger 222 of second conduction heat pump 220 and the air within freezer chamber 124.

A hot side heat exchanger 216 of first conduction heat pump 210 and a hot side heat exchanger 226 of second conduction heat pump 220 may be positioned at or within machinery compartment 150. Hot side heat exchanger 216 of first conduction heat pump 210 and hot side heat exchanger 226 of second conduction heat pump 220 may each include a plurality of plates, fins, pins, etc. to facilitate convective heat transfer with air. A first machinery fan 218 is positioned at or proximate hot side heat exchanger 216 of first conduction heat pump 210, and a second machinery fan 228 is positioned at or proximate hot side heat exchanger 226 of second conduction heat pump 220. First machinery fan 218 is operable to pull air in machinery compartment 150 across hot side heat exchanger 216 of first conduction heat pump 210 so as to provide forced convection for a more rapid and efficient heat exchange between hot side heat exchanger 216 of first conduction heat pump 210 and the air within machinery compartment 150. Similarly, second machinery fan 228 is operable to pull air in machinery compartment 150 across hot side heat exchanger 226 of second conduction heat pump 220 so as to provide forced convection for a more rapid and efficient heat exchange between hot side heat exchanger 226 of second conduction heat pump 220 and the air within machinery compartment 150. In alternative exemplary embodiments, heat pump system 200 may include a single fan within machinery compartment that is operable to flow air over both hot side heat exchanger 216 of first conduction heat pump 210 and hot side heat exchanger 226 of second conduction heat pump 220.

Operation of heat pump system 200 is controlled by a processing device or controller 230, e.g., that may be operatively coupled to a control panel (not shown) for user manipulation to select refrigeration features of heat pump system 200. Controller 230 can operates various components of heat pump system 200 to execute selected heat pump cycles and features. For example, controller 230 is in operative communication with a motor 219 of first conductive heat pump 210, a motor 229 of second conductive heat pump 220 and fans 214, 218, 224, 228. Thus, controller 230 can selectively activate and operate motor 219 of first conductive heat pump 210, motor 229 of second conductive heat pump 220 and/or fans 214, 218, 224, 228. Controller 230 may include a memory and microprocessor, such as a general or special purpose microprocessor operable to execute programming instructions or micro-control code associated with operation of heat pump system 200. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 230 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Motor 219 of first conductive heat pump 210, motor 229 of second conductive heat pump 220 and/or fans 214, 218, 224, 228 may be in communication with controller 230 via one or more signal lines or shared communication busses.

Figure 4:
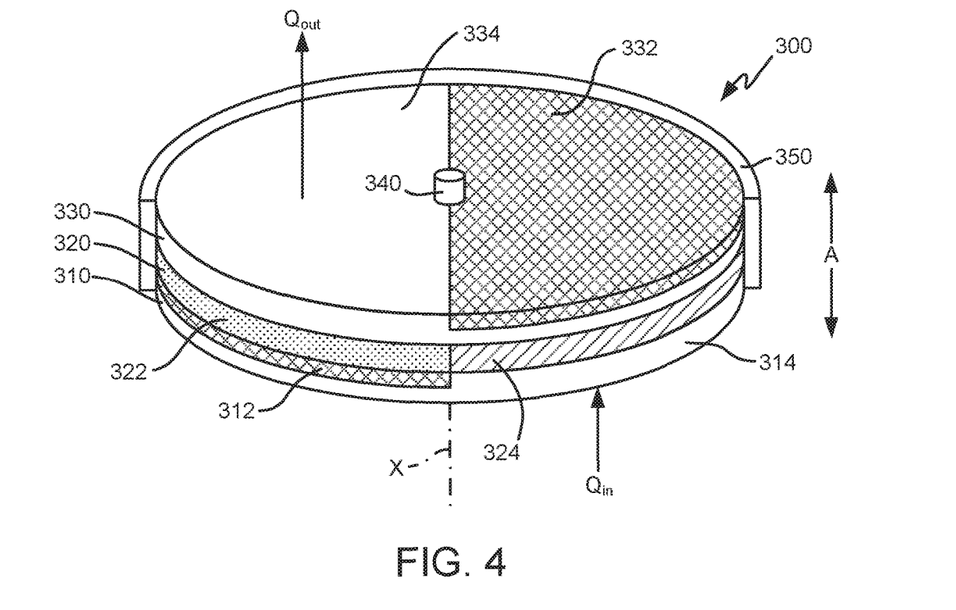
FIG. 4 provides a perspective view of a conduction heat pump according to an exemplary embodiment of the present subject matter.
Figure 5:
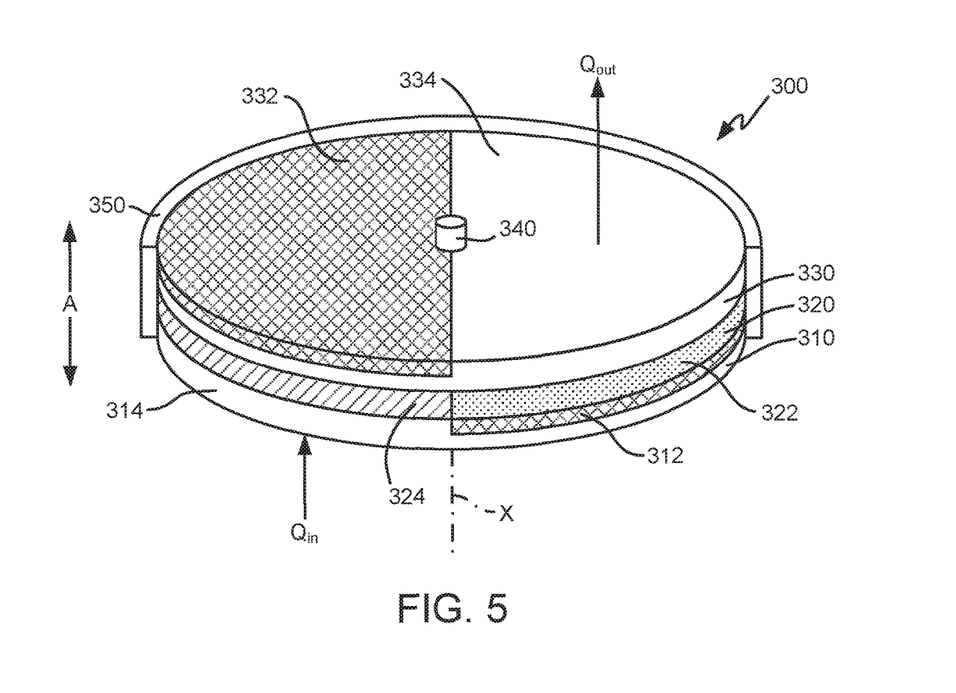
FIG. 5 provides a perspective view of a first plate of the exemplary conduction heat pump of FIG. 4.

FIGS. 4 and 5 provide perspective views of a conduction heat pump 300 according to an exemplary embodiment of the present subject matter. Conduction heat pump 300 may be utilized in or with heat pump system 200, e.g., as one of first and second conduction heat pumps 210, 220. It should be understood that conduction heat pump 300 may be used in or with any suitable appliance, such as a water heater appliance, a dishwasher appliance, a dryer appliance, an air conditioner appliance, etc., in alternative exemplary embodiments. As discussed in greater detail below, conduction heat pump 300 includes features for relative rotation between a caloric material and a field generator in order to combine application of a field from the field generator with heat transfer.

As may be seen in FIG. 4, conduction heat pump 300 includes a first plate 310, a second plate 320 and a third plate 330. First, second and third plates 310, 320, 330 are stacked with one another. In particular, second plate 320 may be positioned between first and third plates 310, 330, e.g., along an axial direction A of conduction heat pump 300. Second plate 320 may also be positioned proximate (e.g., in contact with) first and third plates 310, 330 for conductive heat transfer between second plate 320 and first and third plates 310, 330. In certain exemplary embodiments, second plate 320 may be spaced apart from first and third plates 310, 330 along the axial direction A by a small gap, e.g., no more than one millimeter.

First, second and third plates 310, 320, 330 may be positioned within an insulated housing 350. For example, insulated housing 350 may extend circumferentially around outer edges of first, second and third plates 310, 320, 330. Insulated housing 350 may be constructed of an insulator material that limits heat transfer along a direction that is perpendicular to an axial direction A of conductive heat pump 300.

First plate 310 has a high field portion or field generator portion 312 and a low field portion or conductive portion 314. Second plate 320 includes a caloric material, such as a magneto-caloric material or an electro-caloric material. Like first plate 310, third plate 330 also has a conductive portion 334. First plate 310 may be fixed relative to third plate 330 such that first and third plates 310, 320, 330 are non-rotatable relative to each other during operation of conductive heat pump 300. In contrast, second plate 320 may be rotatable relative to first and third plates 310, 330. In particular, first, second and third plates 310, 320, 330 may be configured for relative rotation between field generator portion 312 of first plate 310 and the caloric material of second plate 320.

Field generator portion 312 generates or is configured to generate a field, e.g., in the direction of the caloric material of second plate 320. Field generator portion 312 may be any suitable type of field generator. For example, field generator portion 312 may be a magnet, such as a permanent magnet or an electromagnet, and may generate a magnetic field. As another example, field generator portion 312 may be charged with a static voltage and may generate a static electric field. When field generator portion 312 generates an electric field, field generator portion 312 may be electrically insulated from conductive portion 314, e.g., by an insulating material, an air gap, etc., and conductive portion 314 may be charged with a different static voltage than field generator portion 312 or may be grounded.

When the caloric material of second plate 320 is exposed to the field of field generator portion 312, the caloric material of second plate 320 undergoes a reversible temperature change. As shown in FIG. 4, a first portion 322 of second plate 320 may be exposed to the field of field generator portion 312, and a second portion 324 of second plate 320 may be remote from the field of field generator portion 312. Thus, only part of second plate 320 may be exposed to the field of field generator portion 312 at any particular time. As shown in FIG. 5, relative rotation between field generator portion 312 of first plate 310 and the caloric material of second plate 320 moves field generator portion 312 of first plate 310 and the portions of the caloric material of second plate 320 exposed to the field of field generator portion 312 and remote from the field of field generator portion 312 changes, e.g., despite no rotation of second plate 320 between FIGS. 4 and 5. Again, it should be noted that second plate 320 can also be rotated while plates 310 and 330 remain stationary to the same relative effect.

Conduction heat pump 300 utilizes field generator portion 312 of first plate 310 to apply a field to the caloric material of second plate 320 such that the caloric material of second plate 320 increases in temperature and rejects heat, e.g., to one of hot side heat exchangers 216, 226 or ambient air in machinery compartment 150 through third plate 330 (as shown with arrow $Q_{out}$). Conversely, when the field of field generator portion 312 is remote or removed from the caloric material of second plate 320, the caloric material of second plate 320 decreases in temperature and receives heat, e.g., from one of cold side heat exchangers 212, 222 or air in one of fresh food and freezer chambers 122, 124 through first plate 310 (as shown with arrow $Q_{in}$). Thus, relative rotation between first plate 310 and second plate 320 may move field generator portion 312 of first plate 310 relative to the caloric material of second plate 320, and a temperature of the caloric material of second plate 320 changes depending upon whether the caloric material of second plate 320 is exposed to the field from field generator portion 312 in order to transfer heat between first and third plates 310, 330 along the axial direction A.

First, second and third plates 310, 320, 330 may include features for conducting heat, e.g., along the axial direction A, between first and third plates 310, 330. For example, field generator portion 312 of first plate 310 may be less thermally conductive than conduction portion 314 of first plate 310. As an example, when field generator portion 312 of first plate 310 includes a magnet, the magnet may be coated in a thermal insulator to provide field generator portion 312 of first plate 310 less thermally conductivity than conduction portion 314 of first plate 310. Alternatively, a gap or thermal break may be provided between the magnet of the field generator portion 312 of first plate 310 and conduction portion 314 of first plate 310. Thus, it will be understood that the phrase "less thermally conductive" is used herein to mean that conductive heat transfer between conduction portion 314 of first plate 310 and second plate 320, e.g., along the axial direction A, is greater than conductive heat transfer between field generator portion 312 of first plate 310 and second plate 320, e.g., along the axial direction A, during operation of conductive heat pump 300. In such a manner, second plate 320 may reject heat to conduction portion 314 of first plate 310 more efficiently than to field generator portion 312 of first plate 310 during operation of conductive heat pump 300. In a similar manner, second plate 320 may reject heat to conductive portion 334 of third plate 330, e.g., along the axial direction A.

As shown in FIG. 4, third plate 330 may also have a resistive portion 332. Resistive portion 332 of third plate 330 may be less thermally conductive than conduction portion 334 of third plate 330. As an example, when resistive portion 332 of third plate 330 includes a magnet, the magnet may be coated in a thermal insulator to provide resistive portion 332 of third plate 330 less thermally conductivity than conduction portion 334 of third plate 330. Alternatively, a gap or thermal break may be provided between the magnet of resistive portion 332 of third plate 330 and conduction portion 334 of third plate 330. Thus, it will be understood that the phrase "less thermally conductive" is also used herein to mean that conductive heat transfer between conduction portion 334 of third plate 330 and second plate 320, e.g., along the axial direction A, is greater than conductive heat transfer between resistive portion 332 of third plate 330 and second plate 320, e.g., along the axial direction A, during operation of conductive heat pump 300. Collectively, conduction portion 314 of first plate 310 and conductive portion 334 of third plate 330 may provide a conductive path for heat transfer from second plate 320 through first plate 310 and third plate 330, e.g., along the axial direction A. In contrast, field generator portion 312 of first plate 310 and resistive portion 332 of third plate 330 may act as heat insulators relative to conductive portions 314, 334 and limit or block conductive heat transfer from second plate 320, e.g., along the axial direction A, during operation of conductive heat pump 300. It will be understood that the thermal conductivity properties of field generator portion 312 of first plate 310, conductive portions 314, 334 and resistive portion 332 of third plate 330 may be reversed in alternative exemplary embodiments, e.g., such that conductive portions 314, 334 are more resistant to conductive heat transfer and heat is channeled through field generator portion 312 of first plate 310 and resistive portion 332 of third plate 330. Thus, the thermal properties of field generator portion 312 of first plate 310 and resistive portion 332 of third plate 330 are matched and/or identical, and the thermal properties of conductive portions 314, 334 are also matched and/or identical but different than the thermal properties of field generator portion 312 of first plate 310 and resistive portion 332 of third plate 330. In such a manner, field application may be combined with heat transfer in conductive heat pump 300.

In certain exemplary embodiments, first and third plates 310, 330 may have a uniform construction. Thus, resistive portion 332 of third plate 330 may be a field generator portion, such as a magnet, like the field generator portion 312 of first plate 310. In addition, field generator portion 312 of first plate 310 may be offset or unaligned with resistive portion 332 of third plate 330, e.g., along the axial direction. As may be seen in FIG. 4, first, second and third plates 310, 320, 330 may be disc-shaped, e.g., in a plane that is perpendicular to the axial direction A. In addition, first, second and third plates 310, 320, 330 may be uniformly sized and/or shaped in certain exemplary embodiments.

As discussed above, conductive heat pump 300 is configured for relative rotation between second plate 320 and first plate 310 (and third plate 330). Thus, either first and third plate 310, 330 or second plate 320 may be rotatable about an axis of rotation R that is parallel to the axial direction A. Second plate 320 may be positioned between first and third plates 310, 330 along the axis of rotation R. A motor, such as one of motors 219, 229, is operable to rotate either first and third plate 310, 330 or second plate 320 about the axis of rotation R. For example, the motor may be coupled to a shaft 340, and either first and third plate 310, 330 or second plate 320 may be coupled to shaft 340 such that the motor rotates either first and third plate 310, 330 or second plate 320 by rotating shaft 340.

Figure 6:
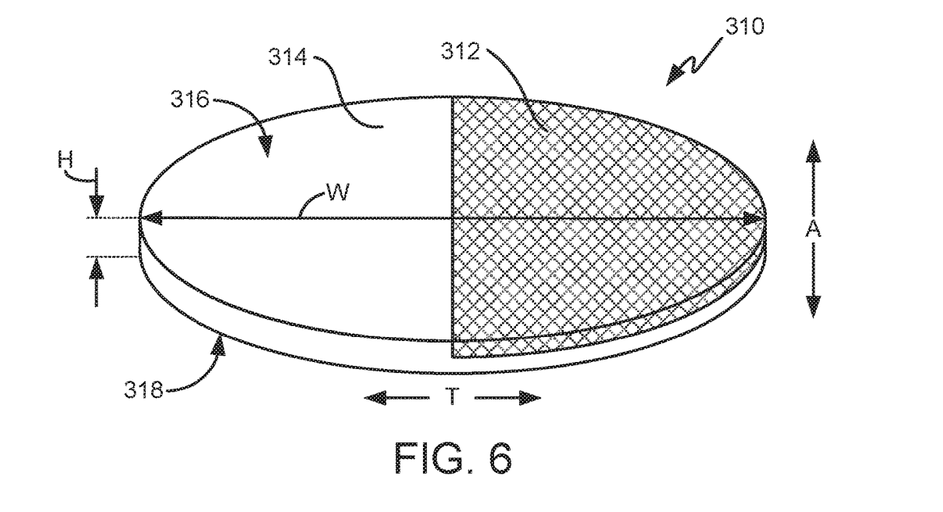
FIG. 6 provides a perspective view of a second plate of the exemplary conduction heat pump of FIG. 4.

FIG. 6 provides a perspective view of first plate 310. As may be seen in FIG. 6, first plate 310 has a first surface 316 and a second surface 318. First and second surfaces 316, 318 of first plate 310 are positioned opposite each other on first plate 310, e.g., along the axial direction A. As an example, first surface 316 may face towards second plate 320, and second surface 318 of first plate 310 may face away from second plate 320. Field generator portion 312 of first plate 310 may be positioned at and partially define first surface 316 of first plate 310, and conductive portion 314 of first plate 310 may also be positioned at and partially define first surface 316 of first plate 310. Conductive portion 314 of first plate 310 may also be positioned at or adjacent second surface 318 of first plate 310 such that conductive portion 314 of first plate 310 is positioned between field generator portion 312 of first plate 310 and second surface 318 of first plate 310, e.g., along the axial direction. In particular, conductive portion 314 of first plate 310 may extend between first and seconds 316, 318 of first plate 310, e.g., along the axial direction A. Conductive portion 314 of first plate 310 may also extend beneath field generator portion 312 of first plate 310 at second surface 318 of first plate 310. As an example, field generator portion 312 of first plate 310 may define about one half of first surface 316 of first plate 310, and conductive portion 314 of first plate 310 may define about the other half of first surface 316 of first plate 310. Conductive portion 314 of first plate 310 may also define about all second surface 318 of first plate 310. As used herein, the term "about" means within ten percent of the stated value when used in the context of surface area.

As shown in FIG. 6, first plate 310 may also define a transverse direction T that is perpendicular to the axial direction A, e.g., and may correspond to a radial direction. First plate 310 has a width W along the transverse direction T. First plate 310 also has a thickness H along the axial direction A. The width W of first plate 310 may be significantly larger than the thickness H of first plate 310. For example, the width W of first plate 310 may be no less than ten times greater than the thickness H of first plate 310. Accordingly, in the exemplary embodiment shown in FIG. 6, first plate 310 may a have a small axial thickness relative to an outer diameter of first plate 310. Thus, conductive heat transfer through first plate 310 through the thickness H of first plate 310 and along the axial direction A may be significantly less limited than conductive heat transfer the width W of first plate 310 and along the transverse direction T. Second and third plates 320, 330 may be sized similarly to first plate 310.

FIG. 6 by way of example shows one field generator portion 312. In other exemplary embodiments, first plate 310 may have any suitable number of field generator portion 312. Each field generator portion 312 alternates with a paired conductive portion 314, with each paired field generator portion 312 and conductive portion 314 having an equal angular or circumferential size.

Figure 7:
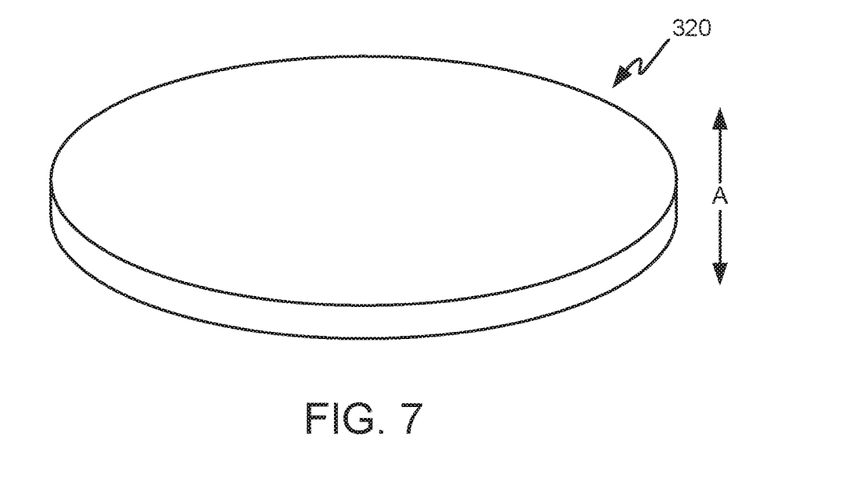
FIG. 7 provides a perspective view of a conduction heat pump according to another exemplary embodiment of the present subject matter.

FIG. 7 provides a perspective view of second plate 320. As may be seen in FIG. 7, second plate 320 may be a uniform body of caloric material, such as magneto-caloric material. In alternative exemplary embodiments, various sections of caloric material may be provided within second plate 320.

Figure 8:
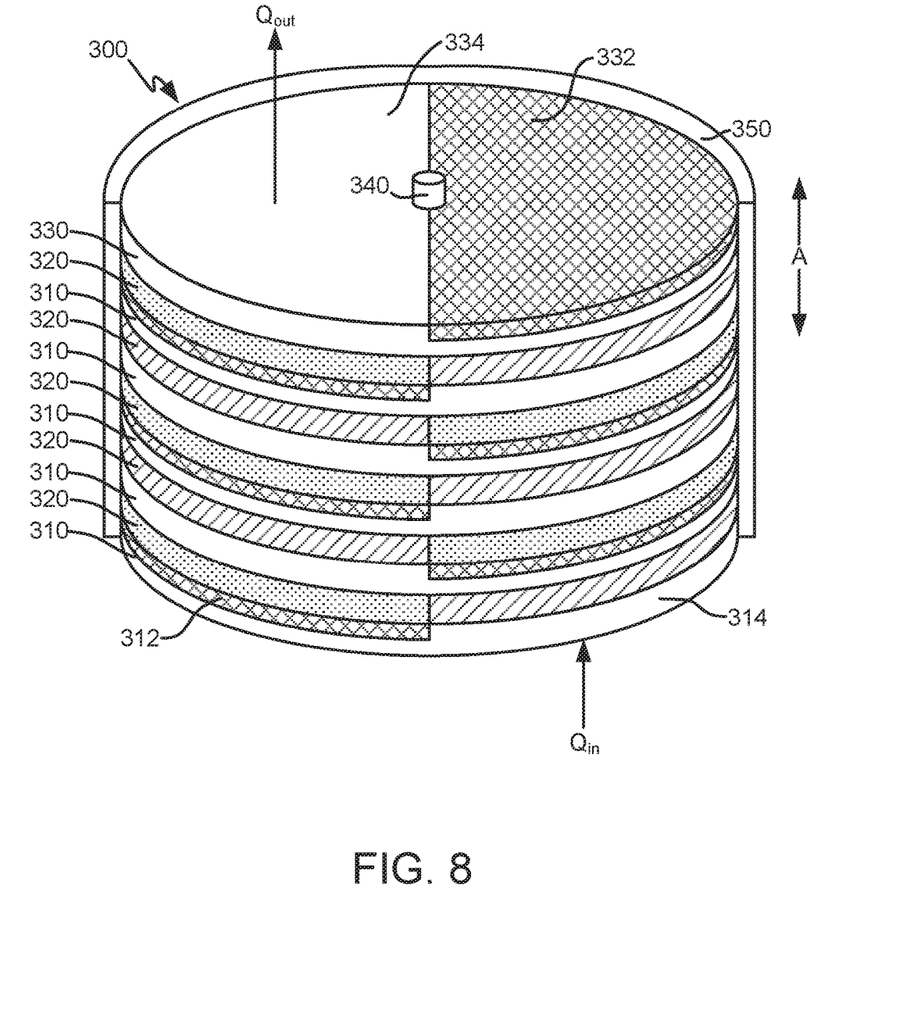
FIG. 8 provides a perspective view of a conduction heat pump according to another exemplary embodiment of the present subject matter.

FIG. 8 provides a perspective view of conduction heat pump 300 according to another exemplary embodiment of the present subject matter. As may be seen in FIG. 8, additional first plates 310 and additional second plates 320 are stacked consecutively within insulated housing 350. Each second plate 320 may have a common caloric material or different caloric material stages.

By stacking common caloric material second plates 320, a larger temperature change may be provided between third plate 330 and an end one of first plates 310, e.g., and thus between machinery compartment 150 and a chilled chamber within refrigerator appliance 100. Different caloric material second plates 320 may be provided to tune conductive heat pump 300 for various operating conditions. In the stack, each first and second plates 310, 320 accepts and rejects heat in an alternating fashion to an adjacent one of first and second plates 310, 320. Second plates 320 may be coupled together to rotate in the same direction or a motor may be operable to rotate adjacent second plates 320 in opposite directions. Alternatively, the motor may rotate first and third plates 310, 330 together in the same direction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A conduction heat pump, comprising:
    a first plate having a field generator portion and a conductive portion, the field generator portion of the first plate being less thermally conductive than the conduction portion of the first plate;
    a second plate comprising a caloric material; and
    a third plate having a conductive portion,
    wherein the second plate is positioned between the first and third plates such that relative rotation between the second plate and the first plate provides movement of the caloric material of second plate relative to the field generator portion of the first plate, a temperature of the caloric material of the second plate changeable when the caloric material of the second plate is exposed to a field from the field generator portion of the first plate, the second plate positioned proximate the first and third plates for conductive heat transfer between the caloric material of second plate and the conductive portions of the first and third plates.

2. The conduction heat pump of claim 1, wherein either the first and third plates or the second plate is rotatable about an axis of rotation, the second plate positioned between the first and third plates along the axis of rotation.

3. The conduction heat pump of claim 2, wherein the first plate defines a transverse direction and an axial direction that are perpendicular, the axial direction being parallel to the axis of rotation, the first plate having a width along the transverse direction and a thickness along the axial direction, the width of the first plate being no less than ten times greater than the thickness of the first plate.

4. The conduction heat pump of claim 3, wherein the first and third plates are uniformly sized.

5. The conduction heat pump of claim 2, further comprising a motor, the first and third plates coupled to each other, the motor operable to rotate either the first and third plates or the second plate about the axis of rotation.

6. The conduction heat pump of claim 1, wherein the third plate also has a resistive portion, the resistive portion of the third plate being less thermally conductive than the conduction portion of the third plate.

7. The conduction heat pump of claim 6, wherein the resistive portion of the third plate is a field generator portion.

8. The conduction heat pump of claim 6, wherein the first and third plates are coupled to each other such that the resistive portion of the third plate is offset from the field generator portion of the first plate.

9. The conduction heat pump of claim 1, wherein the first plate has a first surface and a second surface, the first surface facing towards the second plate, the second surface of the first plate facing away from the second plate, the field generator portion of the first plate positioned at and partially defining the first surface of the first plate, the conductive portion of the first plate positioned at and partially defining the first surface of the first plate, the conductive portion of the first plate positioned at the second surface of the first plate such that the conductive portion of the first plate is positioned between the field generator portion of the first plate and the second surface of the first plate.

10. The conduction heat pump of claim 9, wherein the field generator portion of the first plate defines about half the first surface of the first plate, the conductive portion of the first plate defining about all the second surface of the first plate.

11. The conduction heat pump of claim 1, wherein the caloric material is a magneto-caloric material, an electro-caloric material or an elasto-caloric material.

12. The conduction heat pump of claim 1, further comprising an insulated housing, the first, second and third plates disposed within the insulated housing.

13. The conduction heat pump of claim 1, wherein the first, second and third plates are disc-shaped.

14. The conduction heat pump of claim 1, further comprising at least one additional first plate and at least one additional second plate that are stacked consecutively with the first and second plates.

15. The conduction heat pump of claim 14, further comprising a motor operable to rotate the second plate and the additional second plate about an axis of rotation, the motor operable to rotate the second plate and the additional second plate in opposite directions.

16. The conduction heat pump of claim 14, wherein the first plate and the additional first plate are uniform.

17. The conduction heat pump of claim 14, wherein the second plate and the additional second plate have different caloric materials.

18. The conduction heat pump of claim 1, wherein the field generator portion of the first plate is a plurality of field generator portions and the conductive portion of the first plate is a plurality of conductive portions, each field generator portion of the plurality of field generator portions of first plate being paired with a respective conductive portion of the plurality of conductive portions of the first plate.

19. The conduction heat pump of claim 1, wherein the second plate comprises multiple pieces of the same caloric material.

20. The conduction heat pump of claim 1, further comprising a first heat exchanger and a second heat exchanger, the first heat exchanger positioned at and thermally coupled to the first plate, the second heat exchanger positioned at and thermally coupled to the third plate.

21. A conduction heat pump, comprising:
    a first plate having a field generator portion and a field shielding portion;
    a second plate comprising a caloric material; and
    a third plate having a field shielding portion,
    wherein the second plate is positioned between the first and third plates such that relative rotation between the second plate and the first plate provides movement of the caloric material of second plate relative to the field generator portion of the first plate, a temperature of the caloric material of the second plate changeable when the caloric material of the second plate is exposed to a field from the field generator portion of the first plate, the field generator portion of the first plate having a thermal conductivity that is different than the field shielding portion of the first plate and the field shielding portion of the third plate, the second plate positioned proximate the first and third plates for conductive heat transfer between the caloric material of second plate and the first and third plates.

22. A conduction heat pump, comprising:
a first plate having a field generator portion;
a second plate comprising a caloric material; and
a third plate fixed relative to the first plate,
wherein the second plate is positioned between the first and third plates, and
wherein the first, second and third plates comprise means for conductively transferring heat from the third plate to the first plate during relative rotation between the second plate and the first and third plates.

* * * * *